United States Patent
Shin et al.

(10) Patent No.: US 11,463,957 B2
(45) Date of Patent: *Oct. 4, 2022

(54) APPLICATION PROCESSOR THAT PERFORMS CORE SWITCHING BASED ON MODEM DATA AND A SYSTEM ON CHIP (SOC) THAT INCORPORATES THE APPLICATION PROCESSOR

(71) Applicant: SAMSUNG ELECTRONICS CO., LTD., Suwon-si (KR)

(72) Inventors: Taek Kyun Shin, Gwangmyeong-si (KR); Jun Ho Seo, Suwon-si (KR); Jung Hun Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/148,631

(22) Filed: Jan. 14, 2021

(65) Prior Publication Data

US 2021/0136688 A1 May 6, 2021

Related U.S. Application Data

(63) Continuation of application No. 15/390,831, filed on Dec. 27, 2016, now Pat. No. 10,897,738.

(30) Foreign Application Priority Data

Mar. 14, 2016 (KR) .................. 10-2016-0030317

(51) Int. Cl.
*H04W 52/02* (2009.01)

(52) U.S. Cl.
CPC ..... *H04W 52/0229* (2013.01); *H04W 52/028* (2013.01); *Y02D 30/70* (2020.08)

(58) Field of Classification Search
CPC ............ H04W 52/0229; H04W 52/028; Y02D 30/70; Y02D 70/1262; Y02D 70/168
USPC .......................................... 370/311
See application file for complete search history.

(56) References Cited

U.S. PATENT DOCUMENTS

| 7,664,971 | B2 | 2/2010 | Oh |
| 8,595,529 | B2 | 11/2013 | Vangala et al. |
| 8,683,243 | B2 | 3/2014 | Wu et al. |
| 8,855,033 | B2 | 10/2014 | Kim et al. |
| 10,383,124 | B1 | 8/2019 | Naim et al. |

(Continued)

FOREIGN PATENT DOCUMENTS

| KR | 2013-0081796 A | 7/2013 |
| KR | 2014-0050290 A | 4/2014 |

*Primary Examiner* — Kibrom T Hailu
*Assistant Examiner* — Nizam U Ahmed
(74) *Attorney, Agent, or Firm* — Volentine, Whitt & Francos, PLLC

(57) ABSTRACT

An application processor and a system on chip (SoC) that incorporates the application processor are provided. The application processor includes a first core configured to process first data per unit time, a second core configured to process second data larger than the first data per unit time, and a lookup table configured to determine whether to activate the first core or the second core based on at least one of an analysis result of a message signal received by a communications processor, a sensing signal supplied to the application processor and a power level supplied to the communications processor.

18 Claims, 12 Drawing Sheets

(56) References Cited

U.S. PATENT DOCUMENTS

| | | | |
|---|---|---|---|
| 2007/0077964 A1* | 4/2007 | Llanos | H04W 88/06 |
| | | | 455/557 |
| 2013/0009687 A1 | 1/2013 | Matsuyama et al. | |
| 2014/0094198 A1* | 4/2014 | Heo | H04W 52/0274 |
| | | | 455/456.4 |
| 2014/0095896 A1 | 4/2014 | Carter et al. | |
| 2014/0115366 A1 | 4/2014 | Joo et al. | |
| 2014/0196050 A1 | 7/2014 | Yu et al. | |
| 2015/0089251 A1 | 3/2015 | Carlson et al. | |
| 2015/0160714 A1 | 6/2015 | Jun et al. | |
| 2015/0162972 A1 | 6/2015 | Song et al. | |
| 2015/0261583 A1* | 9/2015 | Vanka | G06F 9/544 |
| | | | 719/313 |
| 2015/0261588 A1 | 9/2015 | Liu et al. | |
| 2016/0259649 A1 | 9/2016 | Poornachandran et al. | |
| 2017/0245030 A1* | 8/2017 | Lyubomirsky | H04B 10/07953 |

\* cited by examiner

| A1 | B1 | P2 | CORE SWITCHING VALUE |
|----|----|----|----------------------|
| X1 | Y1 | Z1 | LITTLE CORE |
| X2 | Y2 | Z2 | BIG CORE |

1300

APPLICATION PROCESSOR THAT PERFORMS CORE SWITCHING BASED ON MODEM DATA AND A SYSTEM ON CHIP (SOC) THAT INCORPORATES THE APPLICATION PROCESSOR

CROSS-REFERENCE TO RELATED APPLICATIONS

This is a Continuation of U.S. patent application Ser. No. 15/390,831, filed Dec. 27, 2016, which claims priority to and the benefit of the earlier filing date of Korean Patent Application No. 10-2016-0030317, filed on Mar. 14, 2016 in the Korean Intellectual Property Office, the disclosure of which is hereby incorporated herein by reference in its entirety.

BACKGROUND

1. Technical Field

The present disclosure relates to an application processor and a system on chip (SoC) including the same. More specifically, the present disclosure relates to an application processor that performs core switching depending on modem data, and a system on chip including the same.

2. Description of the Related Art

Recently, message data increasingly contains high-quality video, and accordingly the size of data input to a communications processor such as a modem becomes larger. Such large-volume message data is likely to decrease the performance of the overall system, and thus it is important to reserve sufficient resources of the system in advance.

SUMMARY

The present disclosure is directed to an application processor with improved performance, an SoC that incorporates the application processor and a computer program for execution by the application processor.

In accordance with an exemplary embodiment, the application processor includes a first core configured to process first data per unit time, a second core configured to process second data larger than the first data per unit time, and a lookup table configured to determine whether to activate the first core or the second core. The lookup table determines whether to activate the first core or the second core based on at least one of an analysis result of a message signal received by a communications processor of the, a sensing signal supplied to the application processor and a power level supplied to the communications processor.

In accordance with an exemplary embodiment, the SoC comprises an application processor, a communications processor and a power management IC. The application processor comprises a first core configured to process first data per unit time, a second core configured to process second data larger than the first data per unit time, and a sensing unit configured to receive a sensing signal. The communications processor is configured to receive a message signal via an antenna and to analyze a magnitude of the message signal. The power management IC is configured to supply power to the communications processor. The application processor determines whether to activate the first core or the second core based on at least one of the power level supplied to the communications processor by the power management IC, a determination as to whether or not the magnitude of the message signal analyzed by the communications processor meets a predetermined condition and a determination as to whether or not the sensing signal has been received by the sensing unit.

In accordance with an embodiment, the computer program comprises instructions that determine whether to activate the first core or the second core. The application processor is in communication with a communications processor of the SoC that receives a message signal via an antenna, analyzes a magnitude of the message signal and provides a result of the analysis of the message signal to the application processor. The instructions determine whether to activate the first core or the second core based on at least one of a power level supplied to the communications processor by a power management integrated circuit (IC) of the SoC, a determination as to whether or not the magnitude of a message meets a predetermined condition, and a determination as to whether or not the sensing signal has been received by the sensing unit. The computer program is stored on a non-transitory computer-readable medium.

These and other features and advantages will become apparent from the following description, drawings and claims.

BRIEF DESCRIPTION OF THE DRAWINGS

The above and other aspects and features of the present disclosure will become more apparent by describing in detail exemplary embodiments thereof with reference to the attached drawings, in which:

FIG. 2 is illustrates an example of the lookup table shown in FIG. 1;

DETAILED DESCRIPTION OF THE EMBODIMENTS

Figure 1:
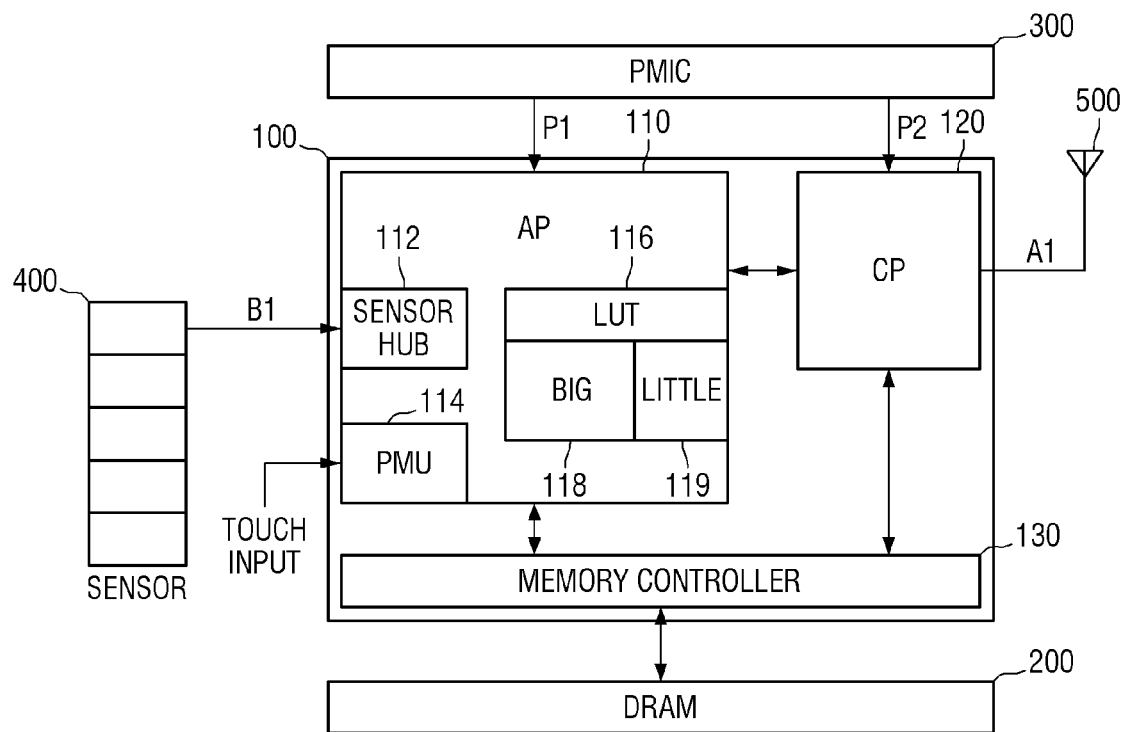
FIG. 1 is a block diagram of a system on chip (SoC) in accordance with an exemplary embodiment.

In the following detailed description, for purposes of explanation and not limitation, example embodiments disclosing specific details are set forth in order to provide a thorough understanding of an embodiment according to the inventive principles and concepts. However, it will be apparent to one having ordinary skill in the art having the benefit of the present disclosure that other embodiments according to the present disclosure that depart from the specific details disclosed herein remain within the scope of the appended claims. Moreover, descriptions of well-known devices, elements or components may be omitted so as to not obscure the description of the example embodiments. Such devices, elements or components are clearly within the scope of the present disclosure. It should also be understood that the word "example," as used herein, is intended to be non-exclusionary and non-limiting in nature. More particularly, the word "exemplary" as used herein indicates one among several examples, and it should be understood that no undue emphasis or preference is being directed to the particular example being described.

It should be noted that when an element or component is referred to herein as being "connected to" or "coupled to" or "electrically coupled to" another element or component, it can be directly connected or coupled, or intervening elements may be present.

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art unless expressly defined differently herein.

A few illustrative, or exemplary, embodiments will now be described with reference to the figures, in which like reference numerals represent like elements, components or features. The figures are not intended to be drawn to scale, emphasis instead being placed on describing inventive principles and concepts.

FIG. 1 is a block diagram of an SoC in accordance with an exemplary embodiment. FIG. 2 is an example of a lookup table of the SoC shown in FIG. 1.

Referring to FIG. 1, the SoC includes an application processor (AP) 110 and a communications processor (CP) 120. The application processor 110 performs operations associated with operating the SoC. In accordance with an exemplary embodiment, the application processor 110 includes a sensor hub 112 that receives a sensing signal B1 from a sensor 400 and a power management unit (PMU) 114 that receives a touch input. In accordance with an exemplary embodiment, the touch input is provided to the power management unit 114 as an external interrupt signal and may wake up or activate the application processor 110. In some embodiments, the sensor hub 112 and the power management unit 114 may be implemented as a sensing unit.

Examples of the sensor 400 include, but are not limited to, a gyro sensor, a luminance sensor, a fingerprint recognition sensor, an image sensor and so on. As indicated above, the sensing signal B1 generated in the sensor 400 is provided to the sensor hub 112 of the application processor 110. The sensor hub 112 may be disposed inside of the application processor 110 or it may be disposed outside of the application processor 110 and operationally connected to it.

The power management unit 114 of the application processor 110 receives a touch input generated via a touch sensor (not shown), for example. Alternatively, the touch input is contained in the sensing signal B1.

The application processor 110 may employ a multi-core system. For example, in accordance with this exemplary embodiment the application processor 110 includes a little core 119 that processes first data per unit time and a big core 118 that processes second data larger than the first data per unit time. In other words, the big core 118 may process more data than the little core 119 does per unit time.

Although FIG. 1 shows only one big core 118 and only one little core 119, the disclosure is not limited with respect to the number of cores or the relative sizes of the cores. For example, in some other embodiments, more than one big core and more than one little core are disposed in the application processor 110. For example, the application processor 110 may include n big cores 118 and n little cores 119, where n is a natural number greater than two. In other embodiments, the application processor 110 may include n big cores 118 and m little cores 119, where m is a natural number greater than two and not equal to n.

In accordance with this exemplary embodiment, the application processor 110 includes a lookup table 116 that includes at least one factor used for determining whether to activate the big core 118 and the little core 119. The lookup table 116 will be described below in more detail.

The communications processor 120 receives a message signal A1 from an external device via an antenna 500 and analyzes the message signal A1 to perform processing operations. Specifically, upon receiving the message signal A1 from an external device via the antenna 500, the communications processor 120 analyzes the header of the message signal A1 and processes portions of the message signal A1 it is capable of processing by using an internal digital signal processor (DSP). If there is a portion of the message signal A1 that cannot be processed by the internal DSP, the communications processor 120 may request that the application processor 110 process that portion of the message signal A1.

In some embodiments, the communications processor 120 includes, but is not limited to, a modem process that receives a 2-generation (2G) message, a 3-generation (3G) message, a 4-generation long term evolution (4G LTE) message, etc.

In some embodiments, the communications processor 120 analyzes the received message and, if the received message is a large-volume message that requires a great amount of processing, notifies the application processor 110 of the large-volume message. For example, in accordance with an embodiment, if the received message is a large-volume message, the communications processor 120 generates a signal to provide the large-volume message to the application processor 110 immediately. Alternatively, the communications processor 120 waits until the application processor 100 wakes up and then provides the generated signal to the application processor 110.

In some embodiments, the application processor 110 and the communications processor 120 are disposed in a single chip 100. That is, the application processor 110 and the communications processor 120 may be implemented as one chip. However, the present disclosure is not limited thereto.

In accordance with an embodiment, the application processor 110 and the communications processor 120 access a DRAM 200 via a memory controller 130. That is, the memory controller 130 functions as an interface for the application processor 110 and the communications processor 120 to communicate with the DRAM 200.

In accordance with another embodiment, the application processor 110 and the communications processor 120 directly share the DRAM 200, i.e., the memory controller 130 is omitted, although not shown in the drawings. Specifically, the application processor 110 may use a first area of the DRAM 200 and the communications processor 120 may use a second area of the DRAM 200. The first and second areas of the DRAM 200 may be divided physically or logically.

The DRAM 200 may function as an operational memory used by the application processor 110 and the communications processor 120 to operate. The DRAM 200 may be disposed outside the application processor 110 and the communications processor 120, as shown in the drawing, or it may be packaged with the application processor 110 and the communications processor 120 as a package-on-package (PoP) assembly.

A power management IC (PMIC) 300 adjusts power levels P1 and P2 supplied to the application processor 110 and the communications processor 120, respectively. In accordance with an embodiment, the power management IC 300 adjusts power levels P1 and P2 supplied to the application processor 110 and the communications processor 120, respectively, by adjusting the amount of current supplied to the application processor 100 and the communications processor 120.

In some embodiments, the power management IC 300 adjusts the power levels P1 and P2 supplied to the application processor 110 and the communications processor 120, respectively, by using techniques including, but not limited to, dynamic voltage & frequency scaling (DVFS), dynamic frequency scaling (DFS), etc.

For example, if a large power level P1 is needed for operating the application processor 110, the power management IC 300 will supply large power level P1 to the application processor 110. If a small power level P1 is needed for operating the application processor 110, the power management IC 300 will supply small power level P1 to the application processor 110.

If a large power level P2 is needed for operating the communications processor 120, the power management IC 300 will supply large power level P2 to the communications processor 120. If a small power level P2 is needed for operating the communications processor 120, the power management IC 300 will supply a small power level P2 to the communications processor 120.

The power management IC 300 may be disposed outside the chip 100 in which the application processor 110 and the communications processor 120 are disposed. However, the present disclosure is not limited thereto.

In the SoC, according to an exemplary embodiment, the application processor 110 determines whether to activate the big core 118 or the little core 119 based on the power level P2 supplied to the communications processor 120 from the power management IC 300.

In addition, in the SoC, according to an exemplary embodiment, the application processor 110 determines whether to activate the big core 118 or the little core 119 based on an analysis result of the message signal A1 received by the communications processor 120 and a sensor input signal, e.g., a touch input, provided to the power management unit 114.

In addition, in the SoC, according to an exemplary embodiment, the application processor 110 determines whether to activate the big core 118 or the little core 119 based on a sensing signal B1 received by the sensing hub 112 or the power management unit 114.

In some exemplary embodiments, the application processor 110 includes the lookup table (LUT) 116, which may include such factors as shown in FIG. 2, for example.

Referring to FIGS. 1 and 2, in accordance with an exemplary embodiment, a default core switching value of the application processor 110 contained in the LUT 116 indicates the little core 119 if the power level P2 supplied to the communications processor 120 from the power management IC 300 is below a predetermined value Z1 contained in LUT 116. The core switching value of the application processor 110 contained in the LUT 116 indicates the big core 118 if the power level P2 supplied to the communications processor 120 from the power management IC 300 is above a predetermined value Z2.

In addition, in accordance with an exemplary embodiment, the default core switching value of the application processor 110 contained in the LUT 116 indicates the little core 119 if the magnitude of the message signal A1 received by the communications processor 120 is below a predetermined value X1. The core switching value of the application processor 110 contained in the LUT 116 indicates the big core 118 if the magnitude of the message signal A1 received by the communications processor 120 is above a predetermined value X2.

In addition, in accordance with an exemplary embodiment, the default core switching value of the application processor 110 contained in the LUT 116 indicates the little core 119 if the sensing signal B1 received by the sensing hub 112 or the power management unit 114 does not meet a predetermined condition Y1. The core switching value of the application processor 110 contained in the LUT 116 indicates the big core 118 if the sensing signal B1 received by the sensing hub 112 or the power management unit 114 meets a predetermined condition Y2.

Although the lookup table 116 shown in FIG. 2 includes the power level P2 supplied to the communications processor 120 from the power management IC 300, the magnitude of the message signal A1 received by the communications processor 120, and the sensing signal B1 received by the sensing hub 112 or the power management unit 114, the LUT 116 may include additional, fewer or different factors. The factors shown in the LUT 116 are used for the purpose of demonstrating some of the inventive principles and concepts, but the present disclosure is not limited to these factors, as will be understood by those of skill in the art in view of the description provided herein. For example, some of the factors shown may be eliminated as desired.

For example, in some embodiments, the LUT 116 may be used to determine the core switching value of the application processor 110 based only on the power level P2 supplied to the communications processor 120 from the power management IC 300.

In addition, in some other embodiments, the LUT 116 may be modified to determine the core switching value of the application processor 110 based only on the power level P2 supplied to the communications processor 120 from the power management IC 300 and on the magnitude of the message signal A1 received by the communications processor 120 or the sensing signal B1 received by the sensing hub 112 or the power management unit 114.

Figure 3:
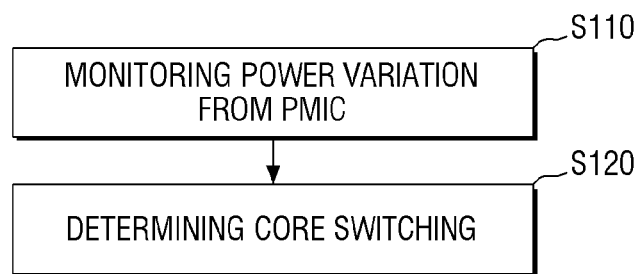
FIG. 3 is a flowchart for illustrating an operation of a SoC shown in FIG. 1 in accordance with an exemplary embodiment.
Figure 4:
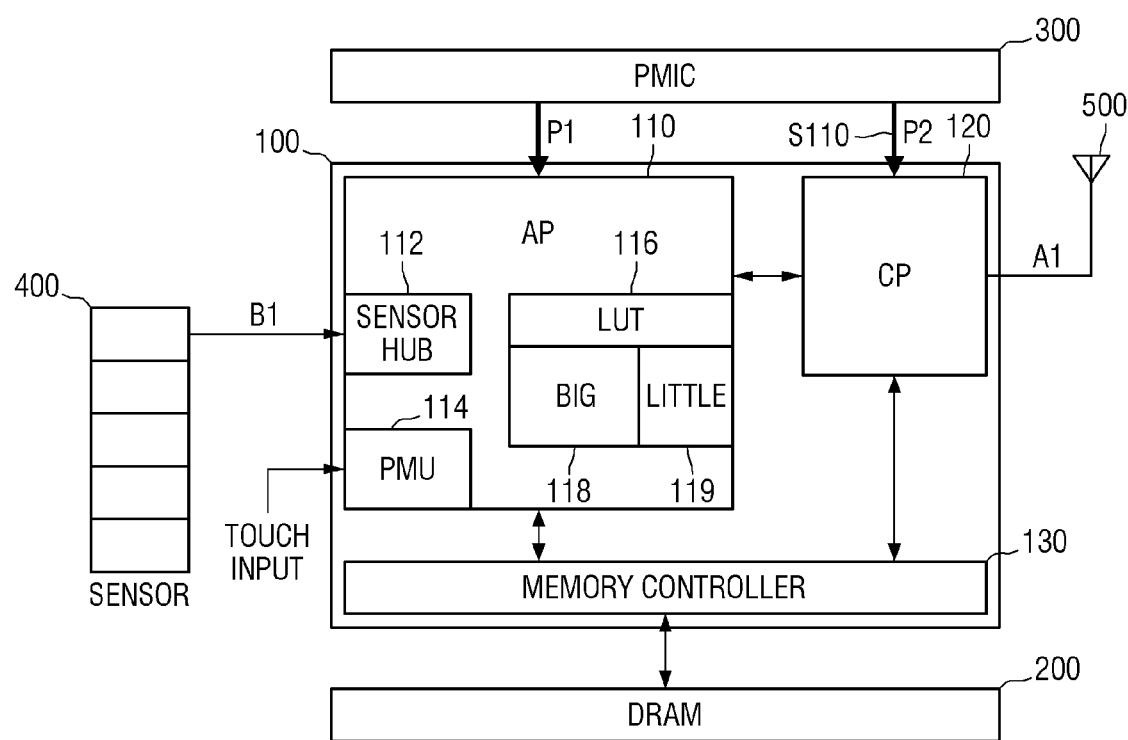
FIG. 4 is a block diagram of the SoC shown in FIG. 1 that demonstrates the operation of the SoC in accordance with the flowchart shown in FIG. 3.

FIG. 3 is a flowchart that illustrates an operation of a SoC shown in FIG. 1 in accordance with an exemplary embodiment. FIG. 4 is a block diagram of the SoC shown in FIG. 1 modified to demonstrate the operation of the SoC in accordance with the flowchart shown in FIG. 3.

Referring to FIGS. 3 and 4, a power level P2 supplied to the communications processor 120 from the power management IC 300 is monitored to see if there is any variation (step S110).

Then, it is determined whether to switch the cores 118, 119 of the application processor 110 based on the monitoring result (step S120).

Specifically, in accordance with this exemplary embodiment, if the power level P2 supplied to the communications processor 120 from the power management IC 300 increases, there is high possibility that the message signal A1 received by the communications processor 120 is a large-volume message that contains, for example, video. If the signal message A1 is a large-volume message, it is desired to use the big core 118 of the application processor 110 for processing the message in order to avoid a reduction, or degradation, in the performance of the overall system. Accordingly, the application processor 110 may activate the big core 118 or may prepare the big core 118 for immediate activation.

On the other hand, if the power level P2 supplied to the communications processor 120 from the power management IC 300 does not substantially increase, there is high likelihood that the message received by the communications processor 120 is a normal message, i.e., not a large-volume message. Processing of such a normal message by the little core 119 may not degrade the performance of the overall system. Accordingly, the application processor 110 may activate the little core 119 or prepare the little core 119 for immediate activation.

Figure 5:
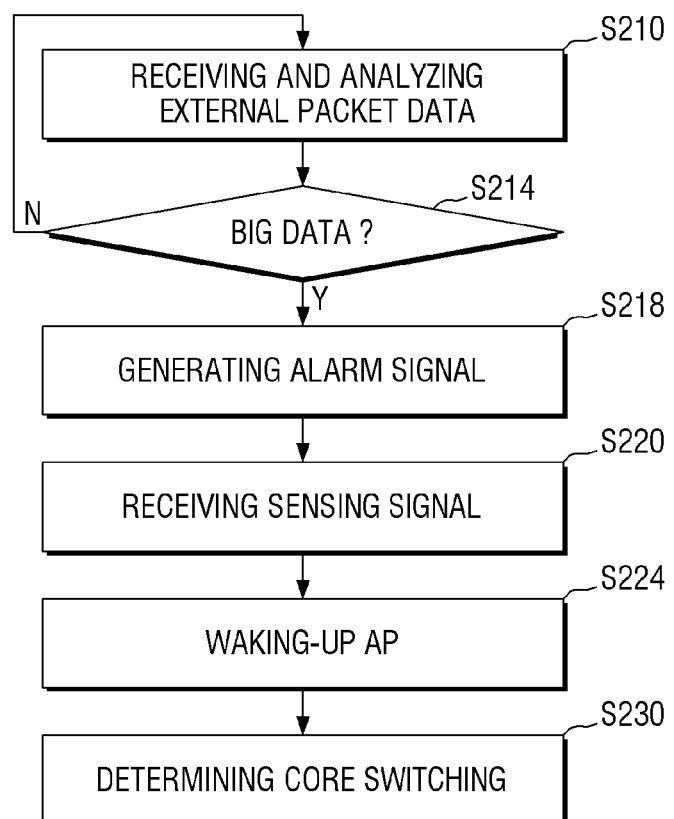
FIG. 5 is a flowchart illustrating an operation of a SoC shown in FIG. 1 in accordance with an exemplary embodiment.
Figure 6:
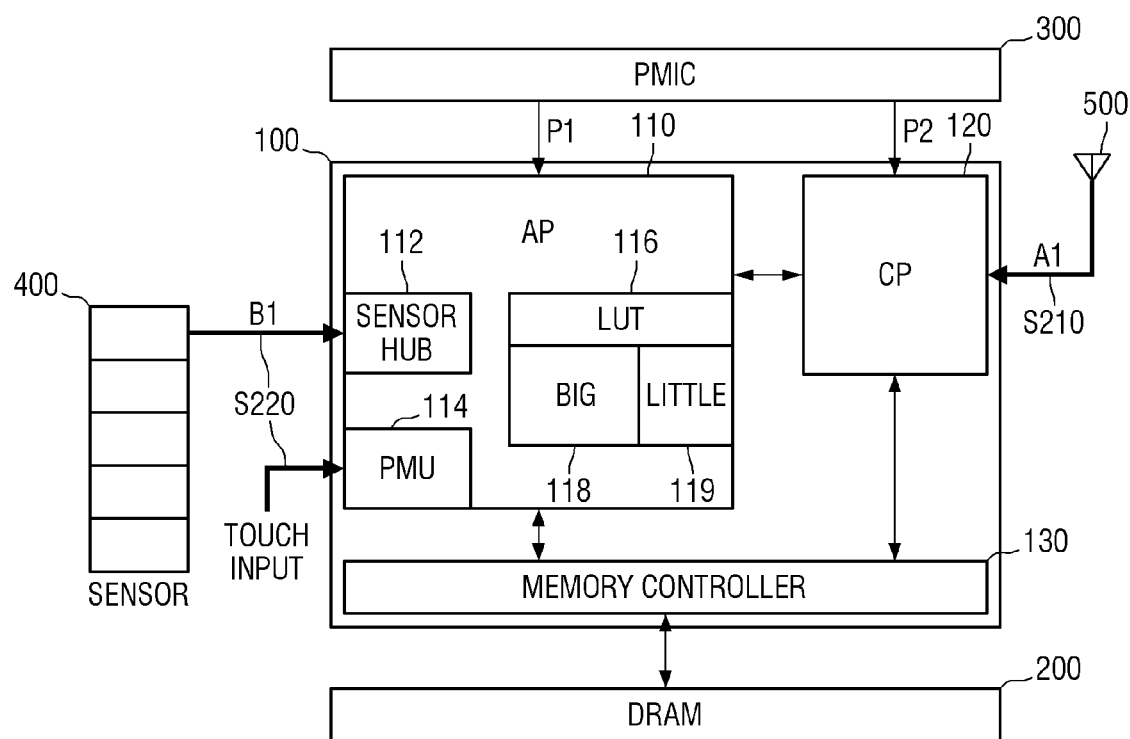
FIGS. 6 and 7 are block diagrams of the SoC shown in FIG. 1 that demonstrate the operation of the SoC in accordance with the flowchart shown in FIG. 5.
Figure 7:
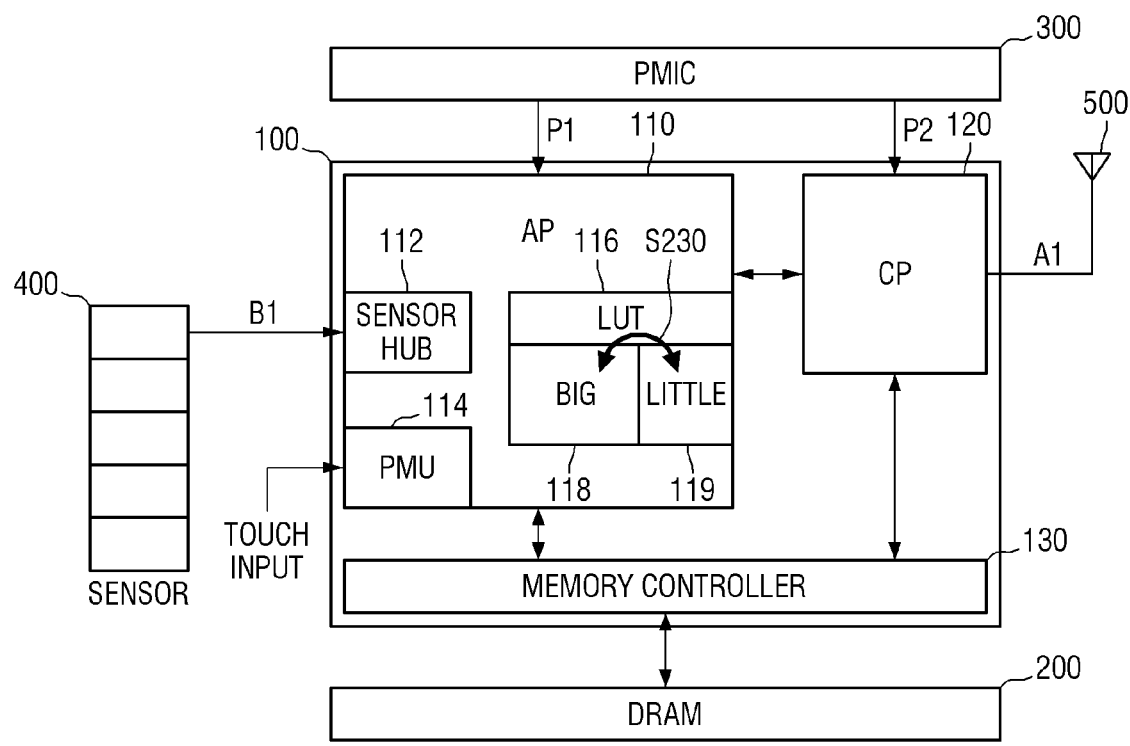

FIG. 5 is a flowchart illustrating an operation of the SoC shown in FIG. 1 in accordance with an exemplary embodiment. FIGS. 6 and 7 are block diagrams of the SoC shown in FIG. 1 that demonstrate the operation of the SoC in accordance with the flowchart shown in FIG. 5;

Referring to FIG. 5, external packet data, e.g., a message signal, to be analyzed is received (step S210). Specifically, referring to FIG. 6, the communications processor 120 may receive external packet data, e.g., the message signal A1, via the antenna 500 and may analyze the header of it. In doing so, the communications processor 120 determines the size of the external packet data, e.g., the message signal A1.

Then, referring to FIG. 5, an alarm signal is generated if the external packet data is a large-volume data packet (steps S214 and S218). Specifically, referring to FIG. 6, the communications processor 120 generates an alarm signal if the external packet data, e.g., the message signal A1, is a large-volume data packet that meets a predetermined condition. In accordance with this embodiment, the alarm signal is supplied to the application processor 110.

In some embodiments, if the application processor 110 is not already awake, the communications processor 120 waits until the application processor 110 wakes up and then provides the alarm signal to the application processor 110.

Then, referring to FIG. 5, upon receiving a sensing signal, the application processor wakes up (steps S220 and S224).

Specifically, referring to FIG. 6, when the sensing signal including a touch input is received by the sensing unit including the sensor hub 112 and the power management unit 114, the application processor 110 wakes up. For example, if a user provides a touch input in order to see the large-volume message received by the communications processor 120, the application processor 110 may wake up to process it.

Referring again to FIG. 5, core switching is performed (step S230). Specifically, referring to FIG. 7, when a user provides a touch input that causes the application processor 110 to wake up, for example, an alarm signal may be provided from the communications processor 120. Accordingly, the application processor 110 may learn in advance that the data to be processed is large-volume data and may prepare the big core 118 to be activated or may immediately activate the big core 118 if necessary.

For example, if the message is a large-volume message, the big core 118 of the application processor 110 may be activated to process the message, whereas if the message is a normal volume message, the little core 119 of the application processor 110 may be activated to process the message.

Figure 8:
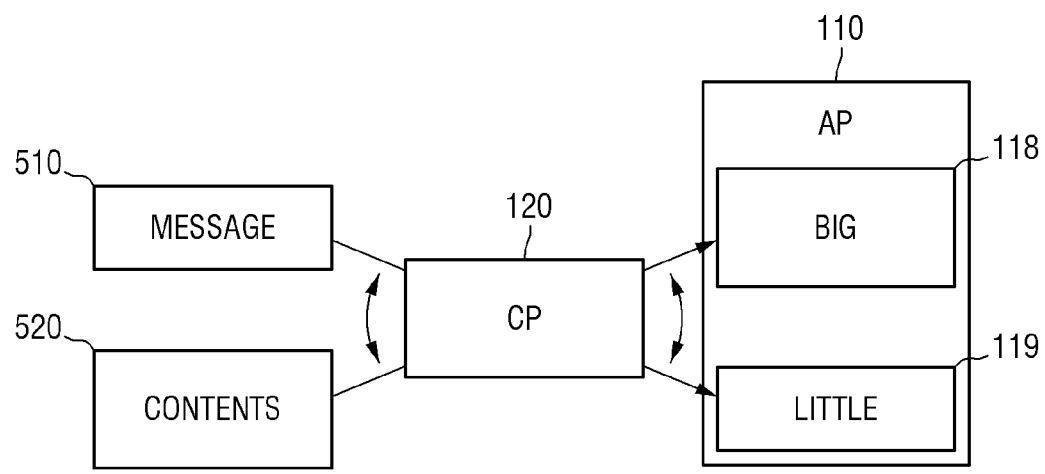
FIG. 8 is a diagram illustrating interactions between the communications processor of the SoC and the cores of the application processor of the SoC for various types of messages received by the communications processor in accordance with an exemplary embodiment.

FIG. 8 is a diagram illustrating interactions between the communications processor 120 and the cores 118 and 119 of the application processor 110 of the SoC for various types of messages received by the communications processor 120 in accordance with an exemplary embodiment. In accordance with an exemplary embodiment, when a normal message 510 containing a small volume of processing data is received by the communications processor 120, the message is processed by the little core 119 of the application processor 110. In addition, because the application processor 110 activates the big core 118 in advance or prepares the big core 118 in advance to be immediately activated, it is possible to prevent the performance of the overall system from being degraded while processing large-volume messages even when a large-volume of message containing a content 520 is received by the communications processor 120. In addition, this can improve the operational stability of the system.

Figure 9:
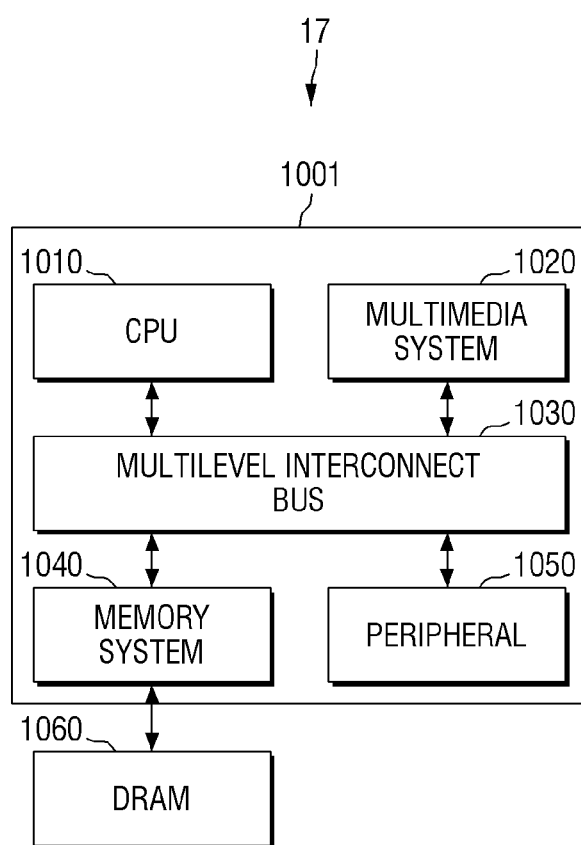
FIG. 9 is a block diagram of a SoC according to another exemplary embodiment.

FIG. 9 is a block diagram of the SoC in accordance with another exemplary embodiment. The SoC 1000 includes an application processor 1001 and a DRAM 1060. The application processor 1001 includes a CPU 1010, a multimedia system 1020, a multi-level interconnect bus 1030, a memory system 1040 and a peripheral circuit 1050. The application processor 1001 may correspond to the application processor 110 of the SoC shown in FIG. 1. The CPU 1010 is configured or programmed to perform operations necessary for driving the SoC. In some embodiments, the CPU 1010 is configured to include multiple cores for operating in a multi-core environment, as described above.

The multimedia system 1020 may be used for performing various types of multimedia functions in the SoC. The multimedia system 1020 typically includes a 3D engine module, video codec, a display system, a camera system, a post-processor, etc. The multi-level interconnect bus 1030 is used for data communications among the CPU 1010, the multimedia system 1020, the memory system 1040 and the peripheral circuit 1050. In some embodiments, the multi-level interconnect bus 1030 has a multi-layer structure. Examples of the multi-level interconnect bus 1030 include, but are not limited to, a multi-layer Advanced High-performance Bus (AHB) and a multi-layer Advanced eXtensible Interface (AXI).

In accordance with this exemplary embodiment, the memory system 1040 provides the application processor 1001 with an environment suitable for high speed operation with an external memory (e.g., the DRAM 1060). In some embodiments, the memory system 1040 includes an additional controller (e.g., a DRAM controller) for controlling an external memory (e.g., the DRAM 1060).

The peripheral 1050 provides an environment suitable for facilitating the connection between the SoC and an external device (e.g., a main circuit board). Accordingly, the peripheral circuit 1050 may have various interfaces that make external devices connected to the SoC compatible with the system.

The DRAM 1060 can function as an operational memory used by the application processor 1001 to operate. In some embodiments, the DRAM 1060 may be disposed outside the application processor 1001, as shown in FIG. 9. For example, the DRAM 1060 may be packaged with the application processor 1001 as a PoP assembly.

Figure 10:
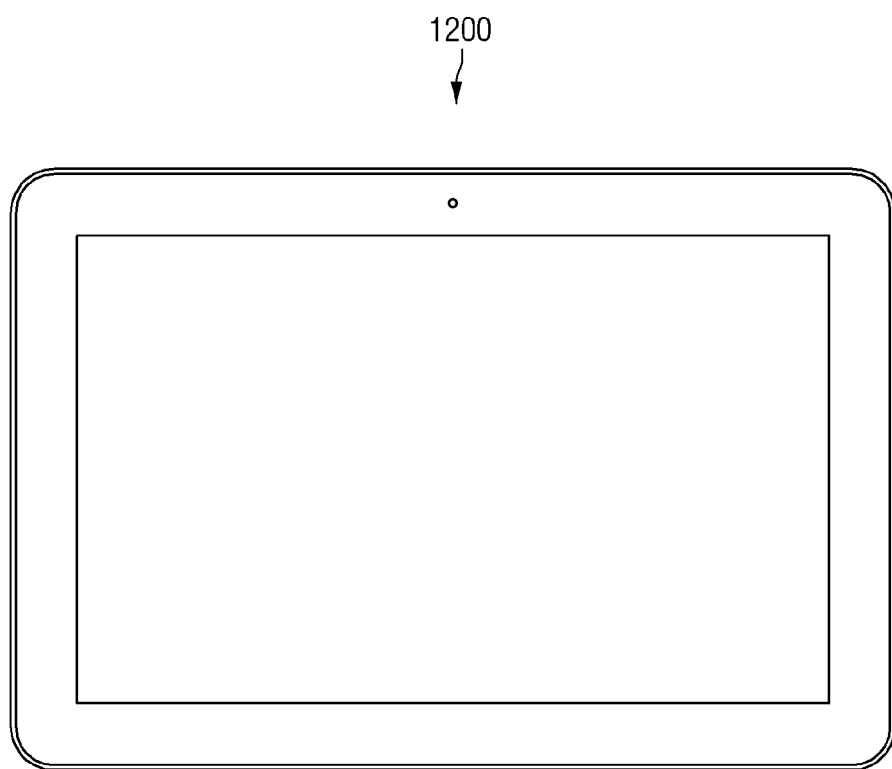
FIGS. 10 through 12 show examples of semiconductor systems that can employ the SoC.
Figure 11:
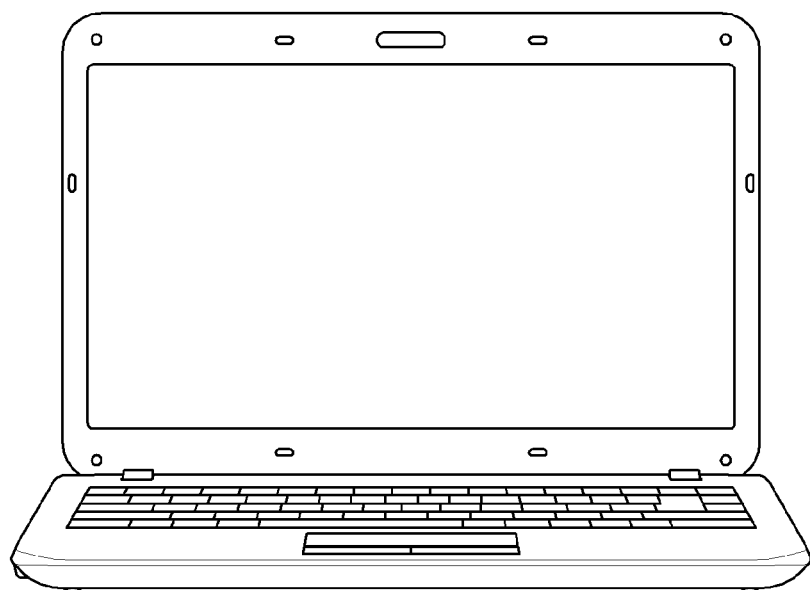
Figure 12:
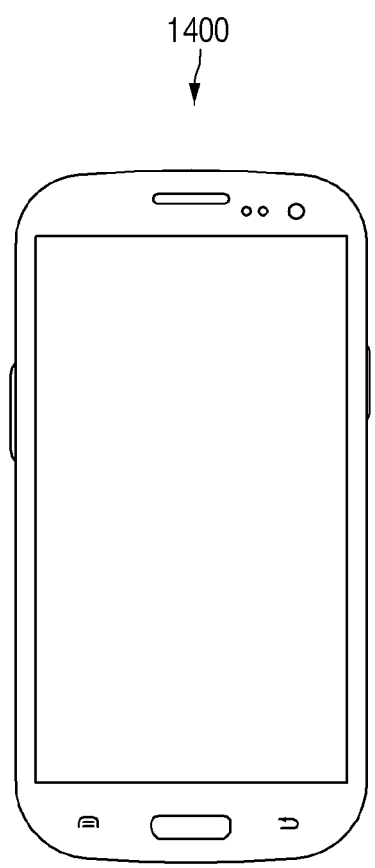

FIGS. 10 through 12 show examples of semiconductor systems that can employ the SoC according to exemplary embodiments. FIG. 10 shows a tablet PC 1200, FIG. 11 shows a laptop computer 1300, and FIG. 12 shows a smartphone 1400. At least one of the SoCs according to the exemplary embodiments described herein is included in each of the tablet PC 1200, the laptop computer 1300, and the smartphone 1400.

In the foregoing descriptions, only the tablet PC 1200, the laptop computer 1300 and the smartphone 1400 have been mentioned as examples of semiconductor systems that may incorporate the SoC of the present disclosure. Persons of skill in the art will understand, however, that the SoC is not limited to such systems. For example, the SoC may be incorporated into other semiconductor systems including, for example: a computer, an Ultra Mobile PC (UMPC), a workstation, a net-book, a Personal Digital Assistants (PDA), a portable computer, a wireless phone, a mobile phone, an e-book, a portable multimedia player (PMP), a portable game console, a navigation device, a black box, a digital camera, a 3-dimensional television, a digital audio recorder, a digital audio player, a digital picture recorder, a digital picture player, a digital video recorder, a digital video player, etc.

While the inventive principles and concepts have been shown and described herein with reference to exemplary embodiments, it will be understood by those of ordinary skill in the art that the inventive principles and concepts are not limited to the exemplary embodiments disclosed herein. Various changes may be made to the embodiments described herein without departing from the spirit and scope of the inventive principles and concepts, as will be understood by those of skill in the art in view of the description provided herein. All such embodiments and modifications thereto are within the spirit and scope of the inventive principles and concepts.

What is claimed is:

1. A communication system comprising:
   an application processor comprising:
      a first processor core configured to process a first amount of data per unit time, and
      a second processor core configured to process a second amount of data per unit time, which is greater than the first amount of data; and
   a communications processor configured to receive a data packet and analyze a header of the data packet, wherein the application processor activates:
      the first processor core to process the data packet in response to a result of the header analysis indicating a magnitude of the data packet is less than a predetermined value, and
      the second processor core to process the data packet in response to the result of the header analysis indicating the magnitude of the data packet is equal to or greater than the predetermined value.

2. The communication system of claim 1, wherein:
   in response to analyzing the header of the data packet, the communications processor is configured to generate a signal that is provided to the application processor, and
   the application processor is configured to activate the second processor core based on the signal.

3. The communication system of claim 1, wherein the communications processor is configured to send a signal to the application processor to activate first processor in advance.

4. The communication system of claim 1, wherein the application processor is configured to wake in response to a sensing device indicating that a touch input has been provided by a user.

5. A communication system comprising:
   an application processor comprising:
      a first processor core configured to process a first amount of data per unit time, and
      a second processor core configured to process a second amount of data per unit time, which is greater than the first amount of data; and
   a communication processor configured to receive a data packet and determine a type of the data packet, wherein the application processor activates:
      the first processor core in response to determining the type of the data packet is not a video packet, and
      the second processor core in response to determining the type of the data packet is the video packet.

6. The communication system of claim 5, wherein:
   in response to determining the type of the data packet, the communications processor is configured to generate a signal that is provided to the application processor, and
   the application processor is configured to activate the second processor core based on the signal.

7. The communication system of claim 5, wherein the communications processor is configured to send a signal to the application processor to activate first processor in advance.

8. The communication system of claim 5, wherein:
   the communications processor is configured to generate an alarm signal that is provided to the application processor, and
   the application processor is configured to activate the second processor core based on the alarm signal.

9. An application processor comprising:
   a first processor core configured to process a first amount of data per unit time; and
   a second processor core configured to process a second amount of data per unit time, which is greater than the first amount of data, wherein:
   the application processor activates:
      the first processor core in response to determining an amount of power supplied to a communications processor is less than a predetermined value, and
      the second processor core in response to determining the amount of power supplied to the communications processor is equal to or greater than the predetermined value.

10. The application processor of claim 9, further comprising a power management integrated circuit (IC) configured to supply power to the communications processor.

11. The application processor of claim 10, wherein the application processor is configured to activate the first processor core or the second processor core based on the amount of the power supplied to the communications processor by the power management IC.

12. The application processor of claim 9, further comprising:
a sensor, wherein
the communications processor is configured to provide an alarm signal to the application processor after the application processor has been awakened by a signal received by the sensor in response to a user touching a touch sensor.

13. The application processor of claim 9, further comprising:
a dynamic random access memory (DRAM) device, wherein
the application processor and the communications processor are configured to share the DRAM device.

14. The application processor of claim 13, wherein the application processor is configured to use a first area of the DRAM device and the communications processor uses a second area of the DRAM device.

15. The application processor of claim 9, wherein the application processor and the communications processor are disposed in a first chip.

16. The application processor of claim 15, wherein a power management integrated circuit (IC) IC is disposed outside the first chip.

17. The application processor of claim 9, wherein the application processor comprises a lookup table used to determine whether to activate the first processor core or the second processor core.

18. The application processor of claim 9, further comprising:
a sensor, wherein
the application processor is configured to activate the first processor core or the second processor core based on whether the sensor indicates that a touch input has been provided by a user and based on the amount of power supplied to the communications processor.

* * * * *